United States Patent
Süßenbach

(10) Patent No.: US 7,393,169 B2
(45) Date of Patent: Jul. 1, 2008

(54) BLIND RIVET FOR A THREADED JOINT

(75) Inventor: Rainer Süßenbach, Steinhagen (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 11/396,834

(22) Filed: Apr. 3, 2006

(65) Prior Publication Data
US 2006/0228187 A1    Oct. 12, 2006

(30) Foreign Application Priority Data
Apr. 7, 2005   (DE) ............... 20 2005 005 536 U

(51) Int. Cl.
*F16B 37/04* (2006.01)
*F16B 13/06* (2006.01)

(52) U.S. Cl. .................. 411/38; 411/51; 411/183

(58) Field of Classification Search ........... 411/34, 411/37, 38, 183, 51
See application file for complete search history.

(56) References Cited

U.S. PATENT DOCUMENTS

| | | | | |
|---|---|---|---|---|
| 2,409,352 A * | 10/1946 | Gill | ............... | 411/38 |
| 3,013,643 A * | 12/1961 | Perry | ............... | 403/224 |
| 3,257,889 A * | 6/1966 | Fischer | ............... | 29/525.12 |
| 3,304,830 A | 2/1967 | Shackelford | | |
| 3,343,442 A * | 9/1967 | Knowlton et al. | ............... | 411/34 |
| 3,348,444 A * | 10/1967 | Brignola | ............... | 411/38 |
| 3,489,312 A * | 1/1970 | Hunckler et al. | ............... | 220/235 |
| 4,007,659 A * | 2/1977 | Stencel | ............... | 411/34 |
| 4,639,174 A * | 1/1987 | Denham et al. | ............... | 411/34 |
| 4,875,815 A * | 10/1989 | Phillips, II | ............... | 411/38 |
| 5,078,561 A * | 1/1992 | Wollar et al. | ............... | 411/38 |
| 5,919,016 A * | 7/1999 | Smith et al. | ............... | 411/34 |
| 6,029,942 A * | 2/2000 | Daddis et al. | ............... | 248/635 |
| 6,186,717 B1* | 2/2001 | Cosenza | ............... | 411/43 |
| 6,254,324 B1* | 7/2001 | Smith et al. | ............... | 411/34 |
| 2004/0179920 A1 | 9/2004 | Ando et al. | | |

FOREIGN PATENT DOCUMENTS

| | | |
|---|---|---|
| CH | 430 121 A | 8/1967 |
| DE | 19 26 515 U | 11/1965 |
| DE | 2605658 A1 | 2/1976 |
| DE | 90 01 069 U1 | 5/1990 |
| DE | 698 01 722 T2 | 7/2002 |
| GB | 11 80 542 A | 2/1970 |
| GB | 1368924 | 10/1974 |

* cited by examiner

*Primary Examiner*—Flemming Saether
(74) *Attorney, Agent, or Firm*—Seyfarth Shaw LLP

(57) ABSTRACT

A blind rivet for a threaded joint between a support member and a mounting member consists of a body of elastic material and a sleeve of metallic material. The body is formed as a sleeve-shaped shank adapted to be inserted into a mounting hole of the support member. The shank has a mounting flange and a folding zone adapted to be folded into a fold by a folding operation. The mounting flange and the folding zone are adapted to be supported against opposite sides of said support member. The sleeve of metallic material is disposed within the body. There are provided means for preventing twisting and torsional deformation of the body.

18 Claims, 3 Drawing Sheets

BLIND RIVET FOR A THREADED JOINT

BACKGROUND OF THE INVENTION

The present invention relates to a blind rivet for a threaded joint between a support member and a mounting member.

German utility model DE-GM 90 01 069.8 discloses a blind rivet nut which consists of an external body member of elastic material and a threaded insert of metallic material. The external body member comprises a sleeve-shaped shank adapted to be inserted into a mounting hole of the support member. The shank has a mounting flange and a folding zone adapted to be folded into a fold such that the blind rivet nut is retained at the mounting member by the mounting flange on the one side and by the fold on the other side. The threaded sleeve of the blind rivet nut is divided into a threaded element and a spacer sleeve. The spacer sleeve engages the bottom side of the mounting member at the end of the folding operation. There are also embodiments wherein the threaded sleeve is an integral one-piece part.

In any case, the axial force necessary for the folding operation is transferred from the mounting bolt via the metallic threaded sleeve directly upon the mounting member while the fold needs not to take up the axial force. Nevertheless the prior blind rivet nut is subject to certain strength constraints. If for example the blind rivet nut is to be designed for a threaded joint including a high strength bolt of a strength class of more than 8.8 (according to DIN-JSO 898 part 1), there will be a risk of unacceptable twisting and torsional deformation of the elastic external body member and excessive surface pressure between the end face of the threaded sleeve and the bottom side of the mounting member.

SUMMARY OF THE INVENTION

It is a primary object of the present invention to provide a blind rivet, in particular a blind rivet nut, for a threaded joint which is of a design such as to avoid unacceptable twisting and torsional deformation of the elastic body even under high mechanical loads on the threaded joint.

In accordance with the invention the blind rivet includes means for preventing twisting and torsional deformation of the resilient body.

Preferably, these means comprise longitudinal knurls of the elastic body and the metallic sleeve which are in engagement with each other in the folding zone prior to the folding operation. When a support portion of the sleeve is longitudinally displaced relative to the elastic body during the folding operation, the longitudinal knurls of the sleeve cut or dig corresponding longitudinal knurls into the material of the elastic body. Preferably the longitudinal knurls of the resilient body in the folding zone are of a design such that the longitudinal knurls disposed in opposed relationship within the fold are urged into engagement with each other during the folding operation. As a result the elastic body is prevented from being rotated relative to the sleeve during and after the folding operation.

Furthermore the deformation preventing means may comprise strengthening means for longitudinally strengthening the elastic body. These strengthening means may be formed by flattened surfaces on the outside of the elastic body within the folding zone. These measures assist in providing torsional stiffness of the elastic body.

Furthermore the deformation preventing means may comprise radially extending ribs and depressions on a side wall of an annular groove of the elastic body, the fold being urged against these ribs and depressions during the folding operation.

Preferably the elastic body has an annular web in an area between its mounting flange and its folding zone. The annular web has circumferentially spaced nubs for clampingly retaining the elastic body within the mounting hole of the support member.

The above measures prevent the blind rivet from being rotated and twisted from the very beginning of the folding operation until after the folding operation. As a result the blind rivet may be designed so as to be suitable for a threaded joint including a high strength bolt of a strength class of more than 8.8. Surface pressure between the mounting member and the end face of the sleeve may be kept at acceptable values. The mechanical qualities of the blind rivet with respect to tensile and shear loads are significantly enhanced.

Preferably the contact surface of the mounting flange of the elastic body which engages the support member is divided into engaging and non-engaging parts, e.g. in the form of projections and depressions. This design of the mounting flange and the fold which are engaged against opposite sides of the support member provide for vibration dampening compensation movements and noise reduction as enabled by deformation of the mounting flange and rest deformation of the fold.

The elastic body is made preferably of a thermoplastic elastomeric material on a polyester base or a chemically resistant (diesel oil resistant) and heat resitatt (up to e.g. 150° C.) cross-linked elastomeric material. The elastic material is preferably a polyethylenterephthalate (PBT) or polyethylentherephthalate (PET). Preferably the sleeve is made of brass even though it may be made of other material such as e.g. steel or aluminium alloy.

Preferably the elastic body is an injection molded part made by injection molding of material of about the sleeve.

Preferably the sleeve has an anchoring portion provided with an annular recess which receives a matingly shaped anchoring projection of the elastic body so as to provide for an interlocking connection between the threaded sleeve and the elastic body. As a result the high axial forces required for the folding operation may be readily transferred from the mounting bolt via the sleeve upon the elastic body.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to protected, its construction and operation, and many of its advantages should be readily understood and appreciated.

DETAILED DESCRIPTION OF THE DRAWINGS

Figure 1:
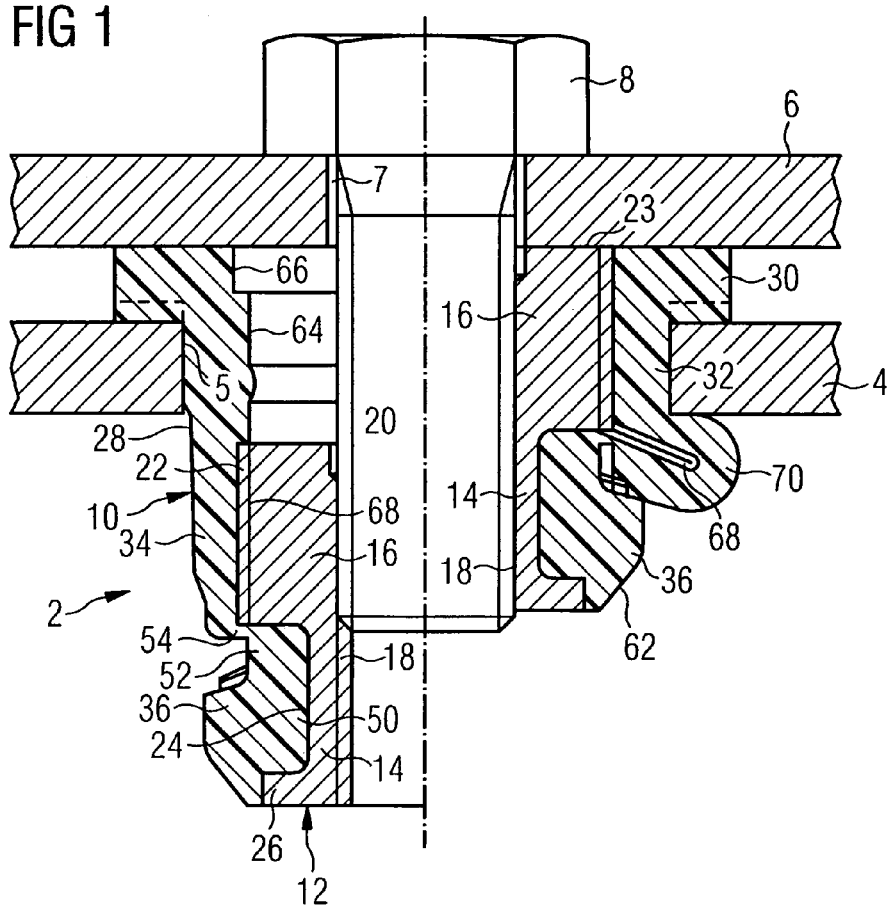
FIG. 1 is a longitudinal section of a blind rivet of the invention within a threaded joint indicated by dash dotted lines, the blind rivet being shown on the left side before the folding operation and on the right side after the folding operation.

In FIG. 1, the blind rivet 2 is a blind rivet nut which forms a part of a threaded joint between a plate-shaped support member 4 and a plate-shaped mounting member 6 retained by a mounting bolt 8 threaded into the blind rivet nut 2. The threaded joint is indicated by dash dotted lines except for the blind rivet nut 2. The support member 4 which is accessible only from the top side thereof has a mounting hole 5 for receiving the blind rivet nut 2, and the mounting member 6 has a mounting hole 7 enabling the mounting bolt 4 to be inserted therethrough as will be explained in more detail below.

The blind rivet nut 2 consists of an external body 10 of elastic material and a threaded sleeve 12 of metallic material. The threaded sleeve 12 is embedded into the body 10 in interlocking relationship thereto.

Figure 4:
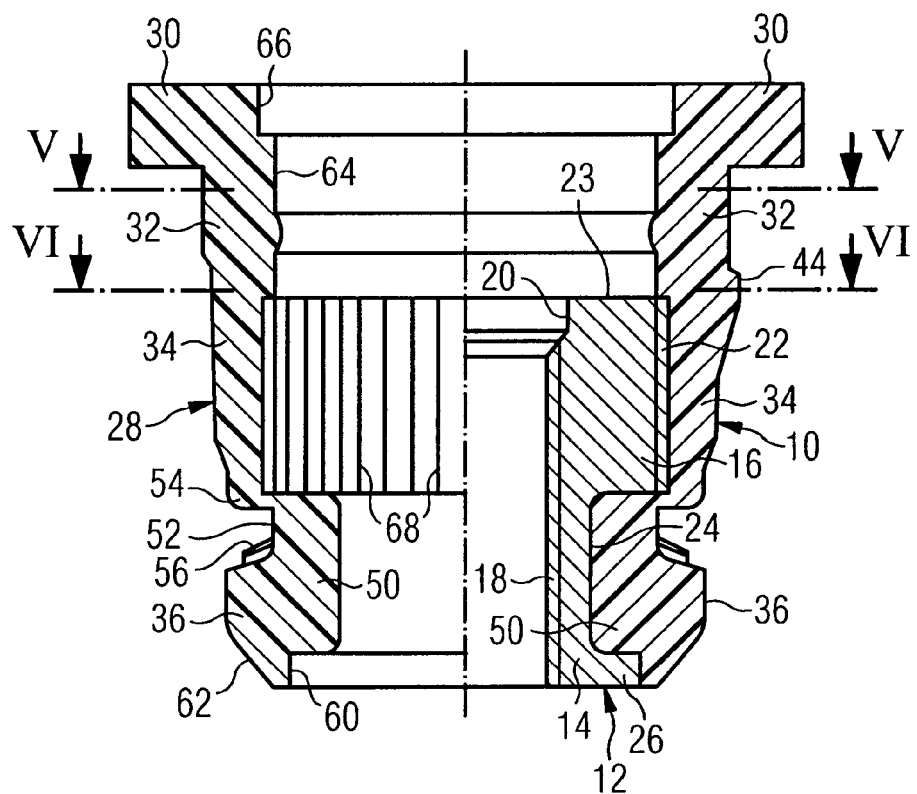
FIG. 4 is a longitudinal section of the blind rivet of FIG. 1, the elastic body of the blind rivet being shown without the threaded sleeve on the left side and with the threaded sleeve on the right side.
Figure 5:
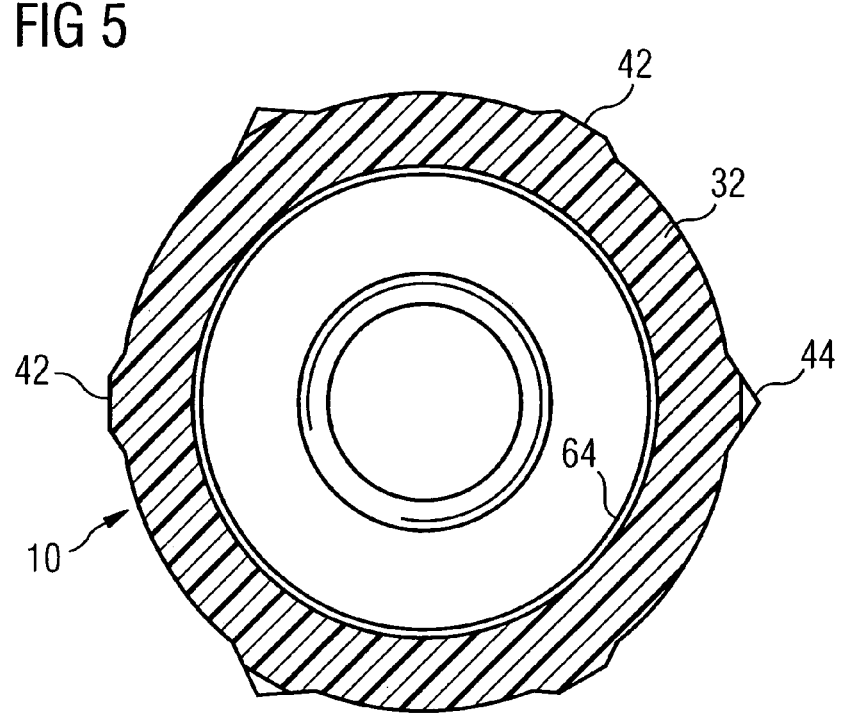
FIGS. 5 and 6 are sectional views in the direction of arrows V-V and, respectively, VI-VI in FIG. 4.
Figure 6:
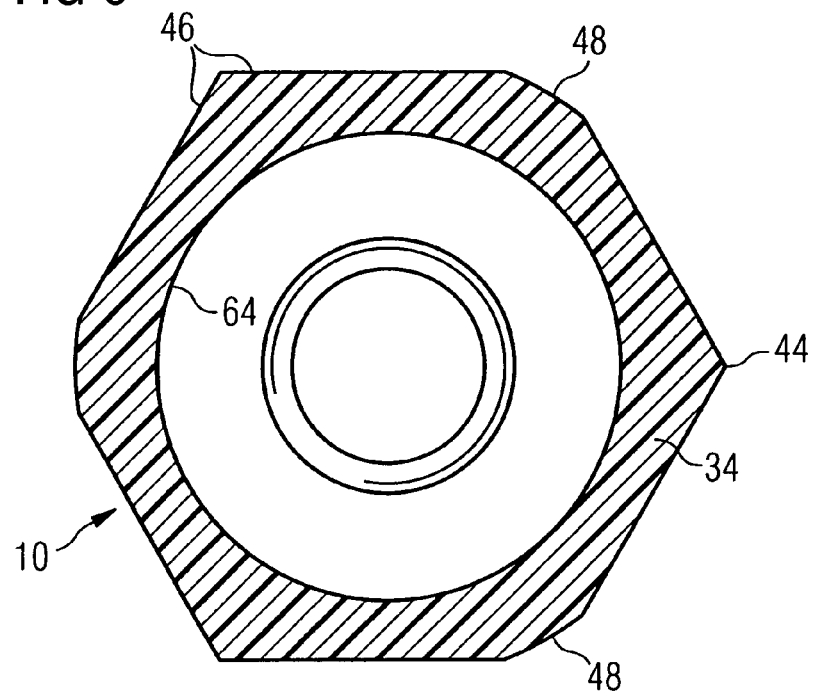

As shown on the right hand side of FIGS. 1 and 4, the threaded sleeve 12 comprises an anchoring portion 14 and an axially adjacent support portion 16. The threaded sleeve 12 is further provided with internal threads 18 which extend substantially along the entire length of the threaded sleeve 12. The length of the internal threads 18 is e.g. substantially twice the diameter of the internal threads 18. An entry portion of the internal threads 18 includes an increased diameter portion 20 to avoid stress peaks and to provide for uniform force distribution.

The generally cylindrical support portion 16 has its outer periphery provided with longitudinal knurls 22 comprising axially extending keys and grooves which cooperate with similar longitudinal knurls of the body 10 as will be explained in more detail below. The upper end face 23 of the support portion 16 is formed as an abutment surface of a size which is sufficient to avoid excessive surface pressure when the abutment surface comes into engagement with the bottom side of the mounting member 6.

The anchoring portion 14 of the threaded sleeve 12 is provided with an annular recess 24 having a radial depth which e.g. exceeds half the radial thickness of the support portion 16 and having an axial length which e.g. exceeds twice the radial depth of the annular recess 24. The lower end of the annular recess 24 is confined by an annular drive flange 26 which exerts a drive force upon the body 10 when the threaded joint is assembled, which will be explained in more detail below.

The threaded sleeve 12 is made of brass even though it may be made from other materials such as steel or aluminium alloy.

The body 10 is made by injection molding of plastic material about the threaded sleeve 12. As explained already above, the plastic material is preferably an elastomeric material on a polyester base, in particular polybutylentherephthalate (PBT) or polyethylenephthalate (PET). While these materials are elastically deformable, they are of a relatively high Shore hardness (in the Shore D range) and exhibit excellent heat resistance (150° c. and more). Furthermore, they are chemically resistant, in particular diesel oil resistant. Other materials which may be used are cross-linked elastomeric materials such as rubber/caoutchouc.

The external body 10 will now be described in more detail. The structure and design of the body 10 is shown, additional to FIGS. 1 and 4, in FIGS. 2, 3, 5 and 6. Generally, the body 10 consists of a sleeve-shaped shank 28 which is made up of a mounting flange 30, an annular web 32, a folding zone 34, and an anchoring portion 36.

Figure 2:
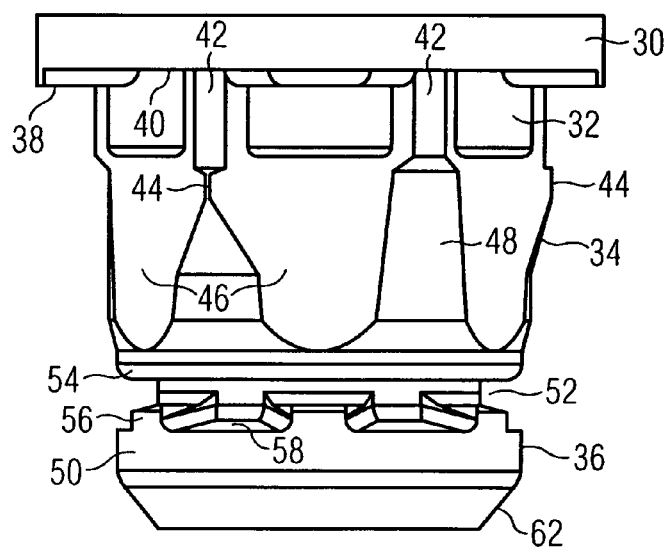
FIG. 2 is an elevation of the blind rivet of FIG. 1 on a reduced scale.
Figure 3:
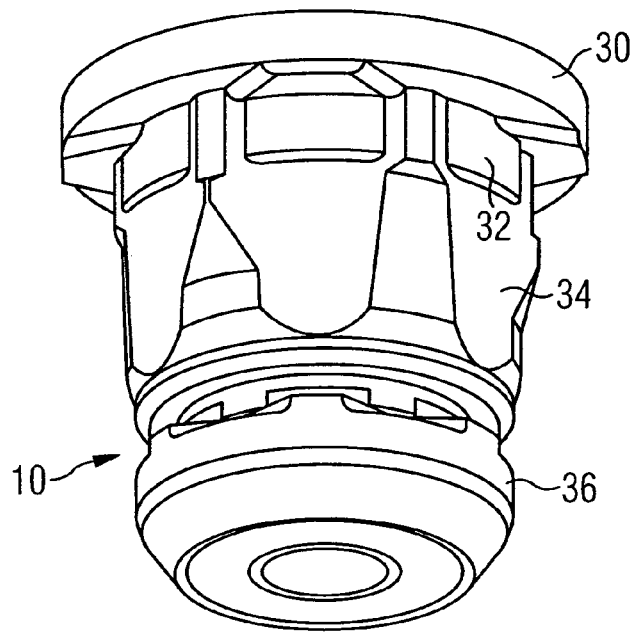
FIG. 3 is a perspective view of the blind rivet of FIG. 2 from below.

As shown in particular in FIGS. 2 and 3, the annular mounting flange 30 has a bottom side which engages upon the top side of the support member 4 in the threaded joint. The bottom side of the mounting flange 30 is divided into engaging parts 38 formed as projections and non-engaging parts 40 formed as depressions. The circumferential extent and the height of the engaging parts 38 will be selected, depending on the specific application, such that the final threaded joint will provide for optimal vibration damping (vibration uncoupling) of the support member 4 as will be explained in more detail below.

The mounting flange 30 is followed by the annular web 32 which is received in the mounting hole 5 of the support member 4 in the threaded joint. The diameter of the annular web 32 is substantially similar to the diameter of the mounting hole 5, and the axial height of the annular web 32 is substantially similar to the thickness of the support member 4. The annular web 32 is provided with a plurality of circumferentially spaced nubs 42 which extend axially and which project radially outwards beyond the annular web 32 in order to clampingly retain the body 10 within the mounting hole 5 of the support member 4. In the embodiment shown, there are provided six nubs 42 even though the number of nubs may be different therefrom.

Axially adjacent the annular web 32 there are a plurality of circumferentially spaced clamping projections 44 radially projecting beyond the annular web 32. In the embodiment shown, there are provided three clamping projections 44 each of which is axially aligned to one of the nubs 42. It is to be understood that the number of clamping projections may be chosen differently. The clamping projections 44—along with the nubs 42 and the mounting flange 30—are intended to retain the blind rivet nut 2 within the mounting hole 5 of the support member 4 before and during assembly of the threaded joint.

The body 10 is of generally tube-like shape in the folding zone 34 and has an outer surface provided with longitudinal strengthening means 48 generated by a plurality (e.g. six) of flattened surfaces 46 which provide for an increased cross section of the shank 28 in circumferentially adjacent areas. The longitudinal strengthening means 48 are arranged so as to be axially aligned to the nubs 42 of the annular web 32 so as to provide for enhanced torsional stiffness of the body 10 in the folding zone 34.

The anchoring portion 36 of the body 10 adjacent the folding zone 34 comprises a radially inwards extending anchoring projection 50 which completely fills the annular recess 24 of the threaded sleeve 12 so as to provide for an interlocking connection between the anchoring portion 40 of the threaded sleeve 12 and the anchoring portion 36 of the body 10.

In an area adjacent the folding zone 34 the anchoring portion 36 has an annular groove 52 which provides for a reduced cross section of the wall at the lower end of the folding zone 34 so as to define a desired buckling area 54 which is adapted to initiate folding of the folding zone 34 during assembly as will be explained in more detail below. At a side wall of the annular groove 52 opposite the desired buckling area 54 there are provided a plurality of circumferentially spaced webs 56 and depressions 58. The webs 56 and depressions 58 extend radially with the webs 56 converging from radially inwards towards radially outwards and the depressions 58 diverging correspondingly from radially inwards towards radially outwards.

Even though the anchoring portion 36 is provided with the annular groove 52, the anchoring portion 36 including the anchoring projection 50 is of relatively large thickness so as to provide for sufficient stiffness of the anchoring portion 36. At its lower axial end the anchoring portion 36 is provided with a portion 60 of reduced cross section to receive the driving flange 26 of the threaded sleeve 12. A tapering surface 62 at the outside of the anchoring portion 36 facilitates insertion of the blind rivet nut 2 into the mounting hole 5 of the support member 4.

The internal bore of the sleeve-shaped shank 28 of the body 10 comprises an upper cylindrical bore portion 64 followed, at its upper end, by an increased diameter bore portion 66 of increased diameter. The annular projection shown within the bore portion 64 results from injection molding and has no relevance as to the function of the blind rivet nut.

Adjacent the bottom end of the bore portion 64 there is a bore portion provided with longitudinal knurls 68 which are matingly shaped to the longitudinal knurls 22 of the threaded sleeve 12 as a result of the injection molding operation, with the longitudinal knurls 22 and 68 being in engagement with each other. The diameter of the bore portion 64 is similar to the core diameter of the longitudinal knurls 22 of the threaded sleeve 12 so as to cooperate with them in a manner to be described below.

Assembly of the threaded joint shown in FIG. 1 and the respective operation of the blind rivet nut 2 will now be described:

At the outset of assembly the blind rivet nut 2 is inserted into the mounting hole 5 from the top side of the support member 4 until the mounting flange 30 engages the top surface of the support member 4. Insertion of the blind rivet nut 2 into the mounting hole 5 is facilitated by the tapering surface 62 at the bottom end of the body 10. The blind rivet nut 2 is now clampingly retained within the mounting hole 5 by the radially deformed nubs 42 on the annular web 32 and are secured at the support member 4 by the mounting flange 30 on the one hand and the clamping projections 44 on the other hand such that the support member 4 and the blind rivet nut 2 can be handled as a structural unit.

To continue with the assembly the mounting member 6 is positioned on the upper surface on the mounting flange 30 such that the mounting hole 7 of the mounting member 6 is axially aligned to the internal threads 18 of the threaded sleeve 12. The mounting bolt 8 may now be moved through the mounting hole 7 so as to engage the internal threads 18 of the threaded sleeve 12. This condition is shown on the left hand side of FIG. 1.

When the bolt is now threaded into the threaded sleeve 12, the threaded sleeve 12 is moved axially upwards. The threaded sleeve 12 drives the lower part of the body 10 upwards via the interlocking connection between the anchoring portions 36 and 50. In particular the driving flange 26 of the threaded sleeve 12 exerts a driving force upon the anchoring portion 50.

As a result of axial displacement of the threaded sleeve 12 and the corresponding movement of the anchoring portion 36 of the body 10 the body 10 is folded in the folding zone 34 into a fold 70 as shown on the right hand side of FIG. 1. The folding operation is initiated at the desired buckling area 54 and continuously progresses during axial displacement of the threaded sleeve 12. Since the bolt 8, due to its rotation, transfers rotational and torsional forces upon the elastic body 10 via the threaded sleeve 12, rotation and unacceptable deformation of the body 10 are to be avoided. To this end there are means for preventing twisting and torsional deformation of the body 10, which means are provided by a plurality of features.

Initially, when the folding operation begins, the body 10 of the blind rivet nut 2 is clampingly retained in the mounting hole 5 of the support member 4 by the nubs 42 on the annular web 32 whereby the body 10 is prevented from being rotated. At the same time the interengaging longitudinals knurls 22, 68 of the threaded sleeve 12 and the body 10 act as means for preventing the threaded sleeve 12 and the body 10 from being rotated relative to each other. While the threaded sleeve 12 is moved axially upwards by the bolt 8, the support portion 16 of the threaded sleeve 12 is longitudinally displaced with respect to the upper part of the body 10 fixed to the support member 4. The longitudinal knurls 22 of the threaded sleeve 16 dig or cut into the material of the body 10 in the area of the threaded bore 64 whereby the longitudinal knurls 22 of the threaded sleeve 10 generate matingly shaped longitudinal knurls in the material of the body 10. As a result rotation of the body 10 relative to the threaded sleeve 12 is prevented during the entire folding operation.

At the same time the longitudinal strengthening means 48 provided by the flattened surfaces 46 in the folding zone 34 of the body 10 assist in preventing unacceptable twisting deformation of the body 10.

At the end of the folding operation the opposed portions of the longitudinal knurls 68 of the body 10 are urged into engagement with each other in the area of the fold 70 whereby an interlocking connection is provided in the area of the fold 70. At the same time the outer surface of the fold 70 including the flattened surfaces 46 and the longitudinal strengthening means 48 are urged against the ribs 56 and depressions 58 at the lower side wall of the annular groove 52 so as to assist in preventing twisting and torsional deformation of the body 10 in the area of the fold 70. As may be seen in particular in FIGS. 2 and 3, the flattened surfaces 46 are axially aligned with the ribs 56, and the longitudinal strengthening means 48 are axially aligned with the depressions 58 so as to enhance the deformation preventing function. In order to optimize the deformation preventing function the top surface of the folding zone 34 and the associated side wall of the annular groove 52 may be designed so as to be of matingly shaped profiles in order to provide for an interlocking connection when the upper surface of the folding zone 34 engages the side wall of the annular groove 52. Such an interlocking connection, however, is not absolutely necessary as should be apparent from the shown embodiment.

In order to ensure that the end surface 23 of the threaded sleeve 12 properly engages the bottom side of the mounting member 6 at the end of the folding operation, the material of the body 10 displaced by the longitudinal knurls 22 of the threaded sleeve 12 is received in the increased diameter bore portion 66. Due to the torsional stiffness of the body 10 and the means for preventing deformation of the body 10 the end surface 23 of the threaded sleeve 12 may be selected so as to be relatively large; as a result the surface pressure between the threaded sleeve 12 and the mounting member 6 can be kept relatively small even though a relatively big tightening force is exerted upon the bolt.

Folding of the fold 70 generates a radially inwards directed force in the area of the desired buckling area 54, which force along with the relatively large wall thickness of the body 10 in the area of the anchoring portion 36 helps to prevent the body 10 from being spread and being released. At the same time this area allows to take up an axial load, e.g. an axial force from the body 10.

When the threaded joint has been assembled, the blind rivet nut 2 is being fixed to the support member 4 by the mounting flange 30 on the one hand and by the fold 70 on the other hand. The design of the abutment surface of the mounting flange 30 with engaging and non-engaging portions 38 and 40 on the one hand and the cantilevered, axially deformable fold 70 on the other hand provide for optimal vibration damping compensation movements of the support member 4 and for noise reduction. Therefore the blind rivet nut 2 as shown and described may be used for example in the field of automotive vehicles.

As should be apparent from the above description, the blind rivet nut can be designed for high strength threaded joints including high strength bolts in particular of the strength class $\geq 8.8$ along with minimal tensile strength and minimal elongation. At the same time the blind rivet nut exhibits optimal mechanical properties with respect to tensile and shear loads along with excellent vibration and noise damping characteristics. Furthermore, the materials of the body 10 described above are suited for applications under high temperature load (up to 150° C. and more) and contaminant loading (in particular diesel oil). Since the elastic body 10 is connected to the metallic threaded sleeve 12 by injection molding, manufacture of the blind rivet nut is relatively simple and inexpensive.

In the embodiment as described the blind rivet is a blind rivet nut which includes a threaded sleeve with internal threads. As an alternative, the sleeve may be formed without threads (not shown). In this case the mounting bolt is inserted through the sleeve from the opposite end of the blind rivet so as to be threaded into threads (not shown) provided in a correspondingly shaped mounting member. The mounting member may be a simple nut. In this case the sleeve would be substantially a spacer sleeve.

I claim:

1. A blind rivet for a threaded joint between a support member and a mounting member, said blind rivet comprising:
    a body comprising a sleeve-shaped shank of elastic material adapted to be inserted into a mounting hole of said support member, said shank comprising a mounting flange, a folding zone adapted to be folded into a fold by a folding operation between a non-folded configuration and a folded configuration, and a first anchoring portion, said mounting flange and said folding zone being adapted to be supported against opposite sides of said support member in said folded configuration, said folding zone and said first anchoring portion being joined by a wall of reduced cross-section to define a desired buckling area for enabling said folding operation, said body being an injection molded part made by injection molding of material about said sleeve,
    a sleeve of metallic material disposed within said body, said sleeve comprising a support portion in said folding zone, said support portion being longitudinally displaceable with respect to said body for performing said folding operation, said sleeve having a second anchoring portion adjacent to said support portion and provided with an annular recess, said first anchoring portion comprising an anchoring projection which, in said non-folded configuration, extends radially inwards and completely fills said annular recess of said second anchoring portion so as to provide for a positively interlocking connection between said sleeve and said body, and
    means for preventing twisting and torsional deformation of said body.

2. A blind rivet as defined in claim 1 wherein said means for preventing twisting and torsional deformation of said body comprise longitudinal knurls of said body and said sleeve which are in engagement with each other in the non-folded configuration.

3. A blind rivet as defined in claim 2 wherein said body is dimensioned in an area adjacent to said folding zone such that said longitudinal knurls of said sleeve are adapted to dig into material of said body in the folded configuration.

4. A blind rivet as defined in claim 3 wherein said body has a recess for receiving material displaceable by said longitudinal knurls in the folded configuration.

5. A blind rivet as defined in claim 2 wherein said longitudinal knurls of said body extend along substantially the entire length of said folding zone such that said longitudinal knurls of said body are adapted for engagement with each other in the folded configuration.

6. A blind rivet as defined in claim 1 wherein said means for preventing twisting and torsional deformation of said body further comprise strengthening means for longitudinally strengthening said body, said strengthening means comprising flattened surfaces on the outside of said shank of said body in said folding zone.

7. A blind rivet as defined in claim 6 wherein said shank of said body has an annular groove adjacent to said folding zone, said annular groove providing the wall of reduced cross-section at an end of said folding zone to define the desired buckling area for initiating said folding operation.

8. A blind rivet as defined in claim 7 wherein said means for preventing twisting and torsional deformation of said body further comprise radially extending ribs and depressions at a side wall of said annular groove opposite to said desired buckling area, said fold adapted to be urged into engagement with said ribs and depressions in the folded configuration.

9. A blind rivet as defined in claim 8 wherein said flattened surfaces at the outside of said shank of said body and said strengthening means provided thereby are adapted to be urged against said ribs and depressions in the folded configuration.

10. A blind rivet as defined in claim 1 wherein said body has an annular web in an area between said mounting flange and said folding zone, said annular web being of an axial thickness substantially similar to a thickness of said support member and being of an outer diameter substantially similar to an internal diameter of said mounting hole of said support member.

11. A blind rivet as defined in claim 10 wherein said annular web of said body has a plurality of circumferentially spaced nubs for clampingly retaining said body within said mounting hole of said support member.

12. A blind rivet as defined in claim 10 wherein said body is provided with a plurality of circumferentially spaced clamping projections between said folding zone and said annular web, said clamping projections cooperating with said mounting flange to retain said blind rivet on said support member in the non-folded configuration.

13. A blind rivet as defined in claim 1 wherein said mounting flange has a support surface adapted to engage said support member, said support surface being divided into engaging and non-engaging portions for vibration dampening purposes.

14. A blind rivet as defined in claim 1 wherein said annular recess of said sleeve has an axial end remote from said support portion and defined by a drive flange adapted to transfer an axial drive force from said sleeve to said body.

15. A blind rivet as defined in claim 1 wherein said blind rivet is a blind rivet nut, with said sleeve being a threaded sleeve having internal threads for receiving a mounting bolt.

16. A blind rivet as defined in claim 15 wherein said internal threads of said threaded sleeve extend along the entire axial length of said threaded sleeve except for an enlarged diameter portion in an entrance area, said internal threads of said threaded sleeve being of a length which is substantially twice the diameter of said internal threads of said threaded sleeve.

17. A blind rivet as defined in claim 1 wherein said body is made of a thermoplastic elastomeric material on a polyester base or of a chemically and heat resistant cross-linked elastomeric material.

18. A blind rivet as defined in claim 17 wherein said elastomeric material on a polyester base is a polybutylenterephthalate (PBT) or polyethylnterephthalate (PET).

* * * * *

UNITED STATES PATENT AND TRADEMARK OFFICE
CERTIFICATE OF CORRECTION

PATENT NO. : 7,393,169 B2  Page 1 of 1
APPLICATION NO. : 11/396834
DATED : July 1, 2008
INVENTOR(S) : Rainer Süßenbach It is certified that error appears in the above-identified patent and that said Letters Patent is hereby corrected as shown below:

Column 7

Claim 2; line 42 "defonnation" should be --deformation--.

Column 8

Claim 8; line 10 "adanted" should be --adapted--.

Signed and Sealed this

Seventh Day of October, 2008

JON W. DUDAS
*Director of the United States Patent and Trademark Office*